UNITED STATES PATENT OFFICE.

GEORGE R. ANCHORS, OF ST. LOUIS, MISSOURI.

METHOD OF MAKING NITROSTARCH AND THE LIKE.

1,376,598.     Specification of Letters Patent.     Patented May 3, 1921.

No Drawing. Application filed March 19, 1918, Serial No. 223,314. Renewed October 15, 1920. Serial No. 417,267.

*To all whom it may concern:*

Be it known that I, GEORGE R. ANCHORS, a citizen of the United States, and a resident of the city of St. Louis, State of Missouri, have invented certain new and useful Improvements in Methods of Making Nitrostarch and the like, of which the following is a specification.

My invention relates to an improved chemical process especially adapted for the production of nitro-starch, and has for its object the provision of an improved chemical process for this purpose, by means of which nitro-starch and other materials may be made with great efficiency. The present invention constitutes an improvement over that disclosed in my prior application filed February 12, 1918, Serial No. 216,698, and relates more particularly to an improved method for subjecting the material to be treated to nitrating acids, the method for separating the nitrated material from the spent acids; and the method for stabilizing the nitro-starch produced.

The invention consists in the method of procedure hereinafter described and claimed.

The preferred form of procedure consists in baking cereals, such as wheat, rice, corn, or the like, and puffing or swelling the same as by popping corn, or puffing or swelling cereals as is ordinarily done for table use. The cereals thus puffed or swelled are then treated with a mixture of nitric and sulfuric acids and water. This mixture preferably consists of thirty per cent. nitric acid, sixty-four per cent. sulfuric acid and six per cent. of water, and is preferably maintained at a temperature of forty degrees F. during the treatment. The puffed or swelled cereals are then subjected to the action of this acid mixture to cause nitration of the same. In doing so, the puffed or swelled cereals are first placed in a suitable receptacle or vat and covered by a perforated plate temporarily held against vertical displacement. The nitrating vessel is provided with a pipe leading into the bottom thereof and the nitrating mixture is introduced into the bottom of the vessel through this pipe, slowly rising therein until the material to be treated is completely covered with the same. This method of subjecting the material to the nitrating acids has the effect of releasing and forcing upwardly any air associated with the particles of material, thus tending to prevent local heating thereof. Owing to the extremely porous condition resulting from the puffing or swelling of the material, the acids readily penetrate the same so that a uniform product is produced in a comparatively short time.

While nitrated starch is heavier and has a greater specific gravity than water, in the form treated, that is, puffed or swelled, there is a certain amount of air imprisoned in the pores of the material which renders the same buoyant and advantage is taken in this condition to separate the nitrated material from the spent acids. To accomplish this, the perforated plate covering and holding the material submerged is removed and water poured gently down the side of the vessel so as to cover and float upon the spent acids without undue mixing thereof. Owing to the buoyancy of the material as above explained, the same tends to float upon this water thus introduced, and the flow of water is continued until the same overflows the vessel, carrying the separated nitro-starch material with it.

The separated material is then washed with water in the usual manner until its acidity, when immersed in a volume of water a hundred times greater, is less than .50% acidity when expressed in terms of sulfuric acid. The material is then boiled in such an acid bath for twelve hours. The bath is then withdrawn in any desired manner, preferably by decanting, and a fresh bath of the same acidity supplied and the material again boiled for twelve hours, the bath being again removed by decanting. This completes the acid treatment.

To stabilize the product the same is immersed in water and soluble salt added which, when dissolved in water, hydrolizes and causes a slight basic reaction. The salt preferably used for this purpose is a soap, preferably a sodium soap. This, when dissolved in water, undergoes hydrolytic dissociation, giving a mild basic reaction. The material is then agitated in this solution, which is heated to the boiling point. As the alkali liberated is used up, more of the salt dissociates and keeps the alkalinity of the water constant. The free fatty acids formed when the alkali is split off unite with some of the molecules of the soap and produce an insoluble compound which adheres to the particles of nitro-starch and accelerates their settling when agitation ceases. The material is thus treated for four hours, when the solution is decanted. Then the material is given three successive treatments in boiling water for three hours each, the water in each case being removed by decanting after each treatment. This produces a stable nitro-starch which is as stable as the best nitro-cellulose.

The excessive water is then removed by a hydro-extractor. The moist starch is then dried at a temperature of 100 C. During this drying process the insoluble compound formed by the action of the free fatty acids and soap molecules melts and fills the pores and covers the grains of the nitro-starch, thereby producing a coating which prevents the absorption of moisture.

While I have set forth and described the preferred method of applying my invention, this is capable of variation and modification without departing from the spirit thereof. I therefore, do not wish to be limited to the precise steps set forth, or the precise proportions of ingredients, but desire to avail myself of such variations and modifications as come within the scope of the appended claims.

Having described my invention, what I claim as new and desire to secure by Letters Patent is:—

1. The method of nitrating starch, which consists in first placing starch in a vessel; and then introducing nitrating solution from the bottom of said vessel, substantially as described.

2. The method of nitrating starch, which consists in first placing puffed starch in a vessel; and then introducing nitrating solution from the bottom of said vessel, substantially as described.

3. The method of separating nitro-starch from the spent nitrating acids which consists in flowing water onto the top of said acids, substantially as described.

4. The method of separating nitro-starch from the spent nitrating acids, which consists in flowing water onto the top of said acids and withdrawing the nitro-starch material in overflowing water, substantially as described.

5. The method of making nitro-starch, which consists in first puffing the starch material; then treating it with a mixture of nitric and sulfuric acids; and then flowing water onto the top of said acids, substantially as described.

6. The method of making nitro-starch, which consists in first puffing the starch material; then treating it with a mixture of nitric and sulfuric acids; and then flowing water onto the top of said acids, and withdrawing the nitro-starch material in overflowing water, substantially as described.

In testimony whereof I have signed my name to this specification in the presence of two subscribing witnesses.

GEORGE R. ANCHORS.

Witnesses:
 Joshua R. H. Potts,
 B. G. Richards.